(12) United States Patent
Kim (10) Patent No.: US 9,709,232 B2
(45) Date of Patent: Jul. 18, 2017

(54) PIXEL MIRROR-TYPE REFLECTION MIRROR FOR NATURAL LIGHTING DEVICE

(71) Applicant: NLS CO., LTD., Gwangju-si, Gyeonggi-do (KR)

(72) Inventor: Seung Han Kim, Gwangju-si, Gyeonggi-do (KR)

(73) Assignee: NLS CO., LTD., Gwangju-si, Gyeonggi-do (KR)

( * ) Notice: Subject to any disclaimer, the term of this patent is extended or adjusted under 35 U.S.C. 154(b) by 0 days.

(21) Appl. No.: 15/106,158

(22) PCT Filed: Dec. 29, 2014

(86) PCT No.: PCT/KR2014/012959
§ 371 (c)(1),
(2) Date: Jun. 17, 2016

(87) PCT Pub. No.: WO2015/102332
PCT Pub. Date: Jul. 9, 2015

(65) Prior Publication Data
US 2017/0030540 A1    Feb. 2, 2017

(30) Foreign Application Priority Data
Dec. 30, 2013 (KR) .......................... 10-2013-0167219

(51) Int. Cl.
*F21S 11/00* (2006.01)
*F21V 7/00* (2006.01)
(Continued)

(52) U.S. Cl.
CPC ........... *F21S 11/007* (2013.01); *F21S 11/002* (2013.01); *F21V 7/00* (2013.01); *F21V 7/05* (2013.01);
(Continued)

(58) Field of Classification Search
CPC ..... F21S 11/002; F21S 11/007; G02B 5/0284; G02B 7/1825
(Continued)

(56) References Cited

U.S. PATENT DOCUMENTS 5,951,157 A * 9/1999 Shirai .................. B60Q 1/0683
                                                      362/284
2002/0051254 A1* 5/2002 Kaneko ................ G02B 7/1825
                                                      358/509
2012/0314314 A1* 12/2012 Wang .......................... F24J 2/38
                                                      359/853

FOREIGN PATENT DOCUMENTS

JP          2000174520 A  *  6/2000
KR     10-2003-0065883 A      8/2003
(Continued)

*Primary Examiner* — Christopher Mahoney
(74) *Attorney, Agent, or Firm* — Novick, Kim & Lee, PLLC; Jae Youn Kim (57) ABSTRACT

A pixel mirror-type reflection mirror for a natural lighting device is provided. A pixel mirror-type reflection mirror for a natural lighting device according to an embodiment of the present invention is installed on a natural lighting device to reflect introduced light to an irradiation area, and comprises: a support plate having a predetermined area; a plurality of reflection units provided as plate-shaped planar mirrors having a predetermined area and arranged on a surface of the support plate to be adjacent to each other, and at least one fastening member for fixing the plurality of reflection units to one side of the support plate, respectively, wherein the initial setting angle of the plurality of refection units is individually adjusted through the fastening member, and the plurality of reflection units expand and transfer sunlight areas using diffusion characteristics of sunlight.

6 Claims, 7 Drawing Sheets

(51) Int. Cl.
  *F21V 7/05* (2006.01)
  *G02B 5/02* (2006.01)
  *G02B 7/182* (2006.01)

(52) U.S. Cl.
  CPC ......... *G02B 5/0284* (2013.01); *G02B 7/1825* (2013.01)

(58) Field of Classification Search
  USPC ........................................................ 359/592
  See application file for complete search history.

(56) References Cited

FOREIGN PATENT DOCUMENTS

| KR | 10-2009-0003965 A | 1/2009 |
| KR | 10-2009-0056051 A1 | 6/2009 |
| KR | 10-20100097852 A | 9/2010 |
| KR | 10-1021166 B1 | 3/2011 |
| KR | 10-1021169 B1 | 3/2011 |

* cited by examiner

PIXEL MIRROR-TYPE REFLECTION MIRROR FOR NATURAL LIGHTING DEVICE

TECHNICAL FIELD

The present invention relates to a natural lighting device, and more particularly, to a pixel mirror-type reflection mirror for a natural lighting device which can be easily manufactured, and in which reflection angles of a plurality of refection units provided as planar mirrors capable of using maximum reflection efficiency are individually adjusted through a fastening member, and sunlight can be transmitted so that illuminance of a lighting area may be designed and sunlight may be freely diffused and concentrated.

BACKGROUND ART

Nowadays, modern people often live in a high rise building such as an apartment or a skyscraper. In such a high rise building such as an apartment or a skyscraper, the front side (southern exposure in the northern hemisphere) facing the sun is always lighted, but the rear face (northern exposure) at the opposite side to the sun is blocked from sunlight by the shadow of the building itself, and another building at the rear side of the building experiences violation of the right-to-sunshine by the building at the front side such that sunlight cannot be transmitted even to the front face thereof. Thus, modern people who live in a place which has no window installed to face the south and in a place experiencing the violation of the right-to-sunshine by a front building, has a very high probability of catching a modern disease such as a sunlight deficiency syndrome due to deficiency in the amount of sunlight.

Accordingly, to solve this, efforts have been continued to secure an amount of sunlight by installing natural lighting devices at a high area such as a rooftop of a building. These natural lighting devices are installed on a rooftop of a high rise building such as an apartment or a skyscraper and can thus limitedly provide a portion of indoor areas with sunlight or can compensate a sunlight-unreachable portion of areas in a building for sunlight.

In order to expand sunlight transmitted to a lighting area, a reflective plate equipped with a surface formed such that sunlight is expanded or a convex mirror is used in these natural lighting devices.

However, when the reflective plate equipped with a surface formed such that sunlight is expanded is used, there is a problem in that lighting efficiency is remarkably degraded because sunlight is scattered to regions other than a lighting area while sunlight is reflected. Also, when the convex mirror is used, there is a problem in that a separate custom-made mold, which is manufactured according to a distance between the natural lighting device and the lighting area and an expansion ratio, is required. In addition, there is a common problem in that it is impossible to set the dispersion or concentration of sunlight with respect to the lighting area.

DISCLOSURE OF THE INVENTION

Technical Problem

To solve the above-described problems, the present invention provides a pixel mirror-type reflection mirror for a natural lighting device which can be easily manufactured, and in which reflection angles of a plurality of refection units provided as planar mirrors capable of using maximum reflection efficiency are individually adjusted through a fastening member, and sunlight can be transmitted so that illuminance of a lighting area may be designed and sunlight may be freely diffused and concentrated by using a characteristic relationship derived from sunlight and pixel mirrors.

Technical Solution

To accomplish the above-described object, the present invention provides a pixel mirror-type reflection mirror for a natural lighting device, the reflection mirror being installed in a natural lighting device to reflect incident light toward an irradiation area and characterized by including: a support plate having a predetermined area; a plurality of reflection units provided as plate-shaped planar mirrors having a predetermined area and arranged on a surface of the support plate to be adjacent to each other; and at least one fastening member for fixing the plurality of reflection units to one side of the support plate, respectively, wherein the initial setting angle of the plurality of refection units is individually adjusted through the fastening member, and the plurality of reflection units expand and transfer sunlight areas using diffusion characteristics of sunlight.

When each of the reflection units has a size about 10 cm·10 cm, a sunlight area expanded to about 56 times the reflection area of the reflection unit may be obtained.

The sunlight area expanded through the reflection unit may satisfy the following equation.

(expanded sunlight area ($cm^2$))=7.7*(reflection area of reflection unit ($cm^2$))+4900 ($cm^2$)

The fastening member may include: a screw rod having a predetermined length and a screw part formed along an outer circumferential surface thereof; an adjusting nut fastened to one side of the screw rod; and a fixing nut disposed to contact a rear surface of the reflection unit and fastened to a central portion of the screw rod in the lengthwise direction of the screw rod.

A spring member may be inserted and disposed between the support plate and the reflection unit which face each other so as to surround the outer circumferential surface of the screw rod.

The reflection unit may be provided to have the shape of a circular face, a polygonal face, or a combination thereof.

Initial reflection angles of the plurality of reflection units may be individually adjusted through adjusting the adjusting nut.

Number of the fastening member may be three, and the three fastening members may be disposed so as to define a triangle.

Advantageous Effects

According to the present invention, there are merits in that it is possible to improve the convenience of use and reduce an initial installation cost because the plurality of refection units provided as planar mirrors are allowed to have reflection angles which can be individually adjusted through a fastening member, can be easily manufactured by using a characteristic relationship derived from sunlight and pixel mirrors, and can use maximum reflection efficiency, and sunlight may be set in a lighting area so as to be freely diffused and concentrated.

BRIEF DESCRIPTION OF THE DRAWINGS

FIG. 5 is a conceptual diagram illustrating the relationship between a reflection unit and a lighting area in FIG. 4.

MODE FOR CARRYING OUT THE INVENTION

Hereinafter, preferred embodiments of the present invention will be described in more detail with reference to the accompanying drawings.

Hereinafter, in providing elements of the drawings with reference symbols to help understanding of the invention, like reference symbols refer to like elements even though being illustrated in different drawings from each other.

A pixel mirror-type reflection mirror 100 for a natural lighting device according to an embodiment of the present invention allows reflection angles of the plurality of refection units 120 provided as planar mirrors to be individually adjusted through a fastening member 130, and sunlight can be transmitted so that illuminance of a lighting area may be designed and sunlight may be freely diffused and concentrated by using a characteristic relationship derived from sunlight and the pixel mirrors.

In general, sunlight in the cosmic space is an omni-light diffused omni-directionally from the sun which is a light source, and the light strength is decreased to be inversely proportional to the square of the distance from the sun.

However, since the distance from the sun to the earth is extremely great, the distance between two different positions on the earth can be neglected. Accordingly, sunlight entering two different positions on the earth can be treated as ideal spot-lights which do not expand but is transmitted only in straight lines in parallel with each other.

However, sunlight entering a mirror has characteristics according to the size and shape (circle) of the sun, and therefore, although being separated by a great distance, since light from an extremely many points on the sun is transmitted to the mirror, an expansion angle is formed according to the distance relationship between the diameter of the sun and the distance between the sun to the mirror (on the earth).

In addition, since sunlight introduced on to the earth also has a scattering property of being naturally spread by colliding with various particles in the atmosphere when entering the atmosphere, reflected light exhibits a shape of the mirror at it is within a short distance just after being reflected from the mirror, but at a long distance, naturally has a circular shape which is expanded according to a circular characteristic of the sun, and it is understood that the smaller the mirror, the remarkably larger the expansion ratio of sunlight with respect to a same distance.

The present patent derives a characteristic relationship between sunlight and a pixel mirror, and by using this, it is possible to design an illuminance (lux unit) and freely diffuse/concentrate sunlight with respect to a lighting area.

That is, when sunlight is reflected by a planar mirror to a wall surface at a small distance, a reflection area of the same size as the reflection area of the planar mirror can be obtained. However, when sunlight is similarly reflected by the planar mirror to a wall surface at a great distance, the sunlight reflected to the wall surface at the great distance is expanded to a large size. This is due to the above-mentioned expansion characteristic of sunlight.

In this patent, the problems of the violation of right-to-sunshine and a permanent shadow at the rear side of a building are solved by using such a characteristic relationship between sunlight and the pixel mirror.

Figure 1:
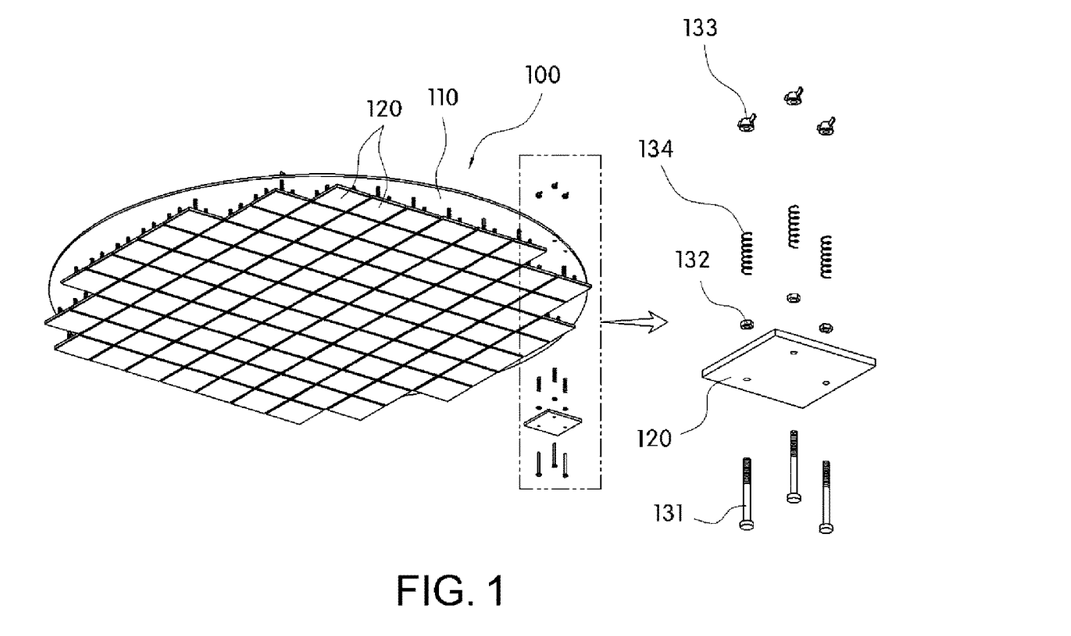
FIG. 1 is a perspective view illustrating an entire pixel mirror-type reflection mirror for a natural lighting device according to an embodiment of the present invention.
Figure 2:
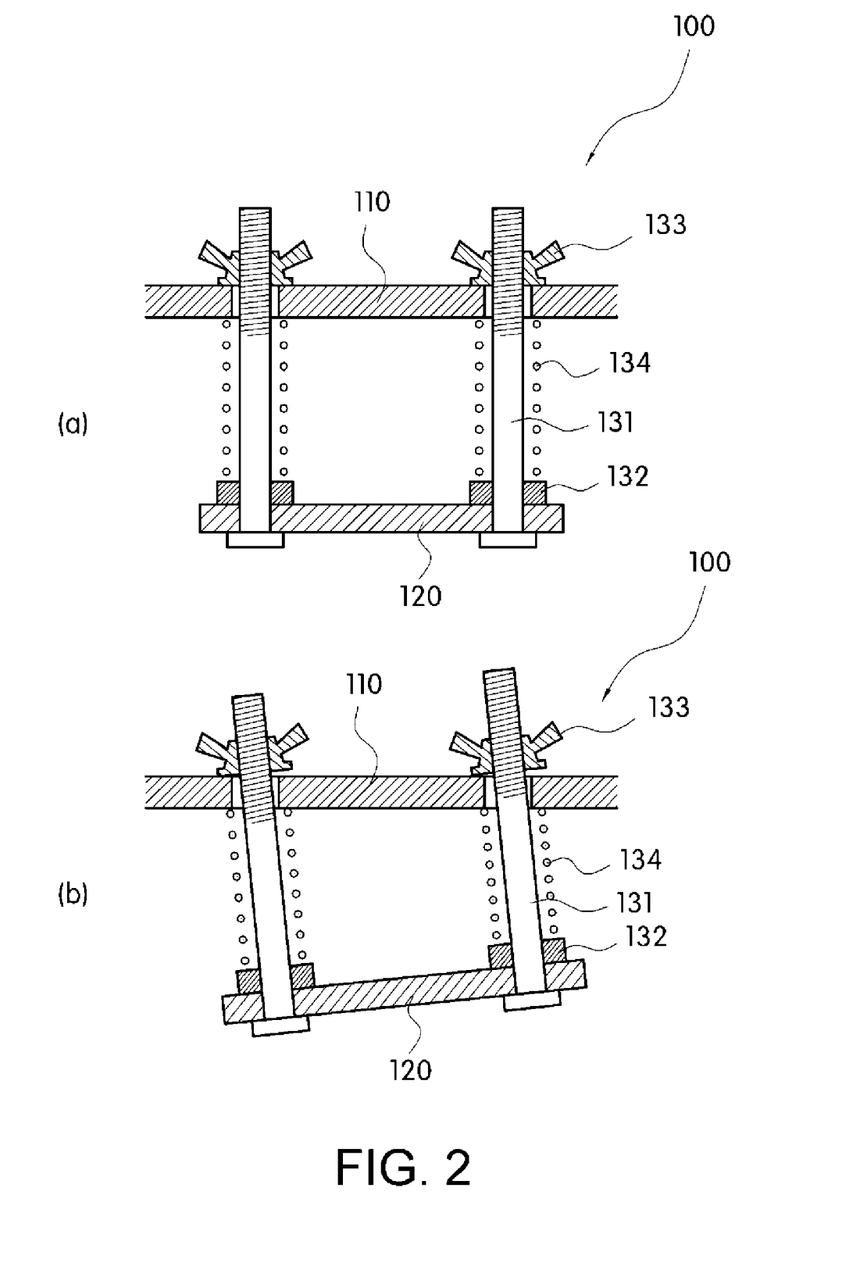
FIG. 2 is a conceptual diagram illustrating the adjustment of an installation angle of a reflection unit through an adjusting nut in a pixel mirror-type reflection mirror for a natural lighting device according to an embodiment of the present invention.

To this end, as illustrated in FIGS. 1 and 2, a pixel mirror-type reflection mirror 100 for a natural lighting device according to an embodiment of the present invention includes a support plate 110, a plurality of reflection units 120, and fastening members 130.

The support plate 110 is provided to have one surface having a plane with a predetermined area, and the plurality of reflection units 120 are fixed to the plane. This support plate 110 is a support structure for fixing the plurality of reflection units 120 such that the support plate is fixed to one side of a natural lighting device 200, and can thereby reflect the entering light to transmit the light to another reflective plate, or can thereby allow the light reflected from another reflective plate to enter and transmit the light toward a desired lighting area.

The plurality of reflection units 120 are provided to reflect and transmit the entering light to a desired area, are composed of a plate-shaped member having a predetermined area, and are provided as planar mirrors.

The present applicant could confirm through an experiment that when sunlight is reflected by a rectangular mirror having a size of about 10 cm×10 cm to a building at a distance of about 80 m, a refection area expanded to about 50 to 60 times the area could be obtained. Preferably, a planar mirror capable of obtaining a reflection area expanded to about 56 times the area was used. Here, it could be confirmed that the illuminance of the expanded sunlight was determined according to a reflection ratio of the planar mirror and the expansion ratio as the following equation.

(illuminance of diffused sunlight)=(illuminance of direct sunlight)·(reflection ratio)/(expansion ratio)   [Equation 1]

In the reflection units 120 of the present invention, a planar mirror provided as a rectangular mirror having a size of about 10 cm·10 cm and being capable of obtaining a reflection area expanded to about 56 times the area when reflecting the sunlight to a building at a distance of about 80 m is used.

In addition, as the following equation, the present applicant derived a relationship of an expanded sunlight area obtained at an irradiation distance of about 80 m with respect to the reflection area of a reflection unit 120 through various measurements.

Here, in each of the reflection units 120, a square planar mirror having horizontal and vertical sides of equal length was used.

(Expanded sunlight area $(cm^2)$)=7.7·(reflection area of a reflection unit$(cm^2)$)+4900 $(cm^2)$   [Equation 2]

TABLE 1

When the irradiation distance is about 80 m, the reflection area of a reflection unit and the expanded sunlight area transferred to the lighting area are:

| Reflection area of a reflection unit (cm$^2$) | Expanded sunlight area (cm$^2$) | Expansion ratio |
|---|---|---|
| 784 | 10936 | 14 times |
| 441 | 8992 | 19 times |
| 191 | 5945 | 32 times |
| 100 | 5670 | 56 times |
| 49 | 5281 | 108 times |

As can be confirmed through the above Table 1, the smaller the reflection area of a reflection unit 120, the smaller the expanded sunlight area obtained at the lighting area, and the greater the reflection area of a reflection unit 120, the greater the expanded sunlight area obtained at the lighting area. On the contrary, it can also be confirmed that the smaller the reflection area of a reflection unit 120, the much greater the expansion ratio of the sunlight area.

This means that the smaller the reflection area of a reflection unit 120, the relatively greater the expansion ratio of the light transmitted to the lighting area, but the smaller the illuminance of the transmitted sunlight. Accordingly, it is clarified that during actual installation, various reflection units 120 having appropriate reflection areas can be used according to a desired expansion ratio and the irradiation distance between the reflection mirror according to the present invention and the lighting area, in consideration of a gradual increase/decrease relationship (see FIG. 6) of the reflection area of the reflection units and the expanded sunlight area according to the distance, which are derived by using above-mentioned Equation 2 and on the basis of Equation 2.

In addition, it is clarified that the reflection units 120 used in the present invention are not limited to a rectangular planar mirror having the size of about 10 cm·10 cm, and can be provided as a planar mirror having an area of various sizes which satisfies the gradual increase/decrease relationship of the reflection area of the reflection unit and the expanded sunlight area according to the distance, which are derived by using above-mentioned Equation 2 and on the basis of Equation 2, as well as the areas shown in Table 1.

Figure 6:
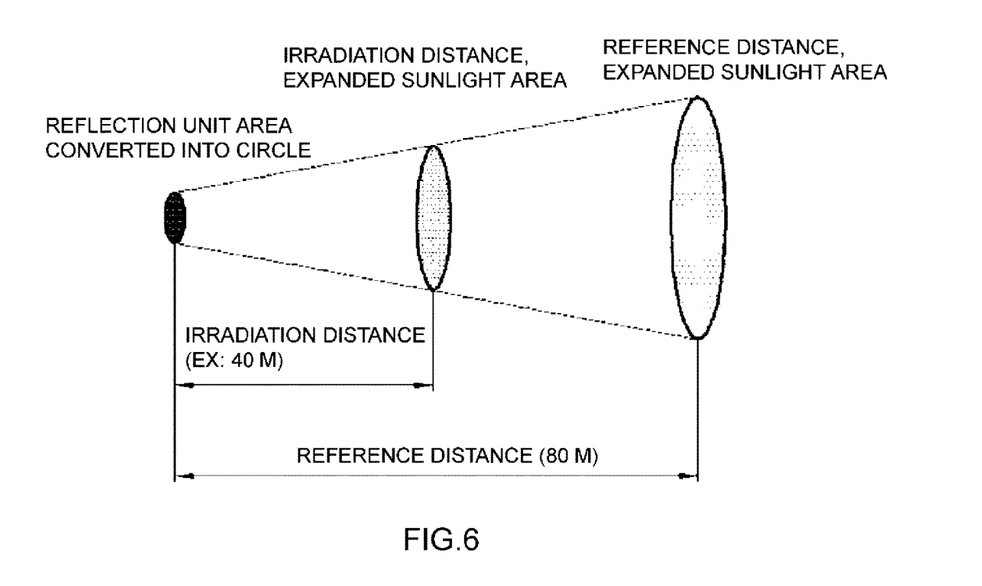
FIG. 6 is a schematic view for describing a relationship of gradual increase/decrease according to a distance between a reflection area of a reflection unit and an expanded sunlight area.

As an example, the gradual increase/decrease relationship of the reflection area of a reflection unit and the expanded sunlight area according to the distance is illustrated in FIG. 6.

Here, the reflection area of a reflection unit 120 is set by converting the reflection unit into circular reflection unit having the same area as the reflection area of the reflection unit regardless of the shape of the reflection unit such as a rectangle or a circle. This is a concept of equalizing the amount of sunlight entering the reflection unit.

Here, in the patent of the present invention, since Equation 2 and Table 1 are derived with respect to a separated distance of about 80 m, the sunlight area in a case of a lighting area having a separated distance of about 40 m can be clearly calculated by using the gradual increase/decrease relationship as illustrated in FIG. 6.

Of course, the expanded sunlight area can also be calculated with respect to an irradiation distance greater than the reference distance by using the same method as the method of calculating the expanded sunlight at a separated distance of about 40 m. Also, when the sunlight illuminance on the reflection unit is divided by the expansion ratio, a lighting illuminance on the corresponding area can also be calculated, and thus illuminance design with respect to the lighting area can be implemented by concentrating or diffusing the expanded sunlight for each reflection unit by finely adjusting the angle of the reflection unit.

In the pixel mirror-type reflection unit 120 for a natural lighting device according to an embodiment of the present invention, as illustrated in FIG. 1, a plurality of reflection units 120 are disposed on one surface of the support plate 110 so as to be adjacent to each other, and are respectively fixed to one surface of the support plate 110 through the fastening members 130.

Here, each fastening member 130 includes: screw rods 131 having predetermined lengths and screw parts formed along outer circumferential surfaces thereof; adjusting nuts 133 fastened to one side of the screw rods 131 so as to be disposed on a rear surface of the support plate 110; and fixing nuts 132 disposed to contact rear surfaces of the reflection units 120 and fastened to central portions of the length of screw rods 131.

Also, spring members 134 are inserted to the screw rods 131 such that one end of each spring member contacts one surface of the support plate 110 and the other end contacts the rear surface of each reflection unit 120.

Here, three fastening members 130 for fixing each of the reflection units 120 are provided and the three fastening members 130 are disposed to define a triangle.

Accordingly, as illustrated in FIG. 2, installation angles of the reflection units 120 respectively fixed through the fastening members 130 on one surface of the support plate 110 are individually adjusted with respect to the support plate 110 by fastening and releasing the adjusting nuts 133. Also, the three fastening members 130 are disposed to define a triangle and thus the reflection units can be adjusted into various installation angles by appropriately adjusting the three fastening members 130. Here, when the fastening nuts 133 are fastened, the spring members 134 are compressed to store elastic force, and then when the adjusting nuts 133 are released, the reflection units 120 are pushed in one direction by the stored elastic force of the spring members 134, and thus, the installation angles of the reflection units 120 are changed.

Therefore, in the pixel mirror-type reflection mirror 100 for a natural lighting device according to an embodiment of the present invention, the installation angles of the plurality of reflection units 120 are individually adjusted through adjusting the fastening members 130, more specifically, adjusting the adjusting nuts 133, and thus entire lighting can be performed by diffusing the reflected sunlight to desired lighting areas or lighting concentrated on one portion can be performed.

More specifically, for example, 120 reflection units 120 are disposed on one surface of the support plate 110. Also, the 120 reflection units 120 are set such that each reflection units light the same area, and thus, a total of 12 set areas are set to be lighted. Here, a total of 12 windows installed in a building to be lighted serve as the 12 lighting areas.

Thus, several areas (windows) which experience violation of right-to-sunshine can all receive the same amount of sunlight by using the natural lighting device 200 provided with the pixel mirror-type reflection mirror 100 for a natural lighting device according to an embodiment of the present invention.

When the concentrated lighting is to be performed on a portion of the 12 set areas, the setting angles are adjusted such that light is transmitted to the selected portion of the 12 set areas from more number of reflection units 120, and thus the amount of transmitted light can be easily adjusted.

Thus, in the pixel mirror-type reflection mirror 100 for a natural lighting device according to an embodiment of the present invention, the reflection angle of each reflection unit 120 is individually adjusted through the fastening member 130, and thus desired areas can be lighted in a diffused manner or in a concentrated manner. 60. Here, in the drawings and descriptions, each of the reflection units 120 is illustrated and described to be provided as a rectangular planar mirror having a size of about 10 cm·10 cm, but the embodiment of the present invention is not limited thereto, and the reflection units 120 can be provided to have various shapes, such as a circular face, a polygonal face, or the combination thereof.

Figure 3:
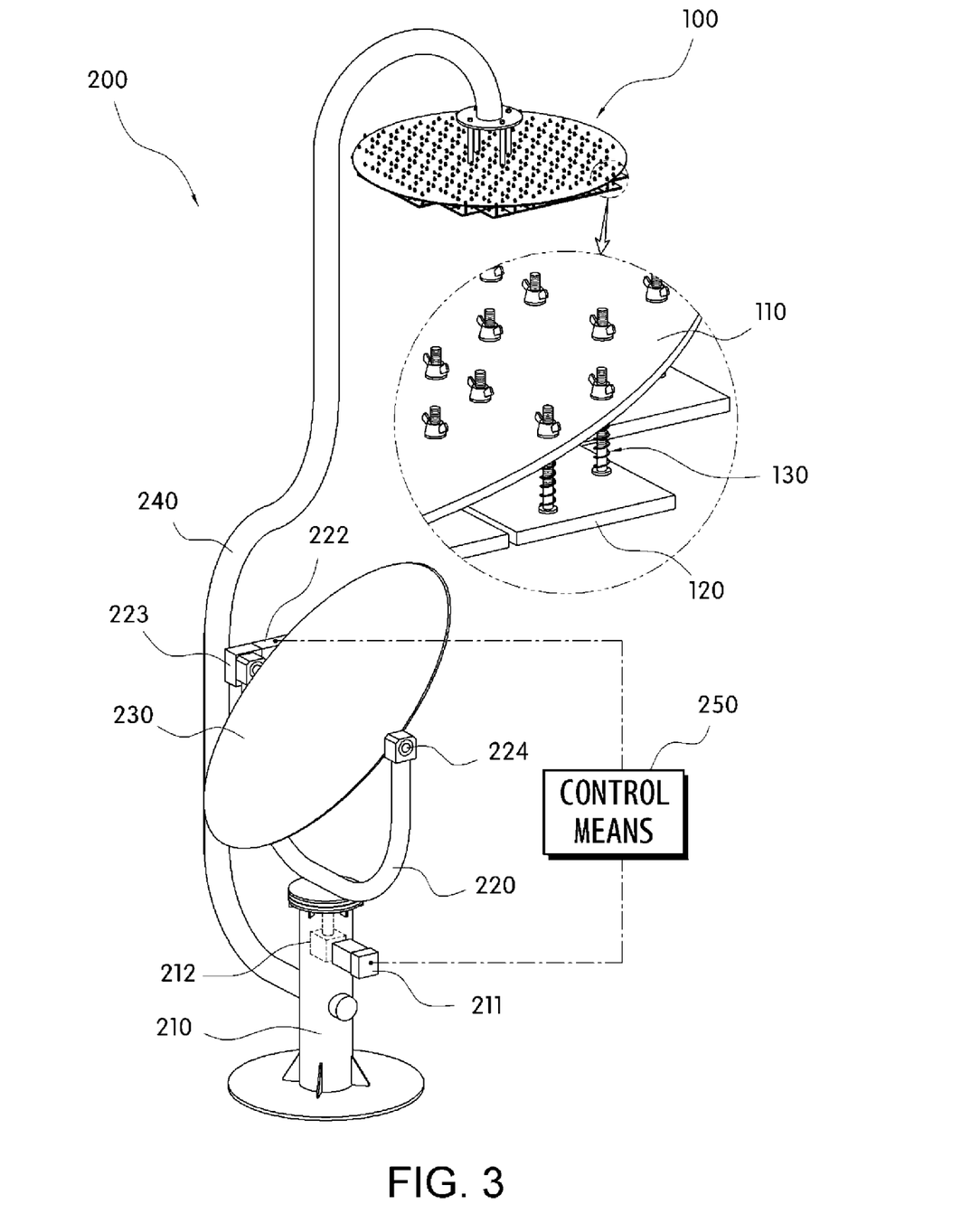
FIG. 3 is a perspective view of an entire natural lighting device in which a pixel mirror-type reflection mirror for a natural lighting device according to an embodiment of the present invention is applied.
Figure 4:
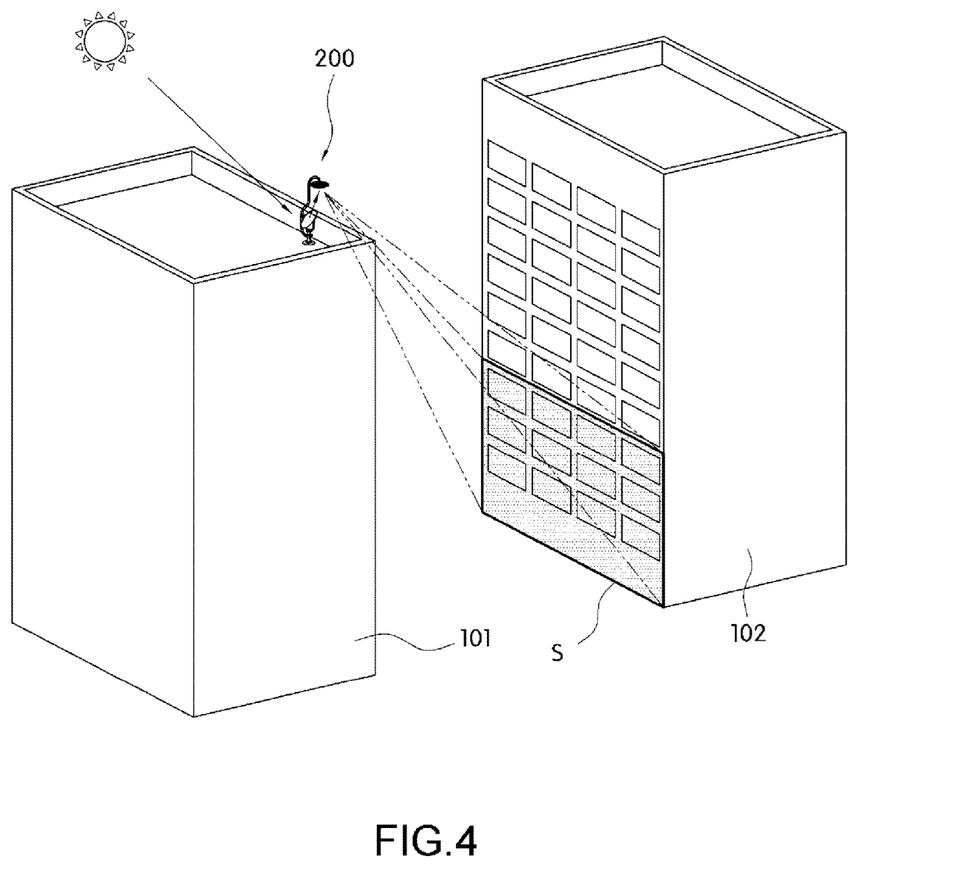
FIG. 4 is a view illustrating an installation state of FIG. 3.
Figure 5A:
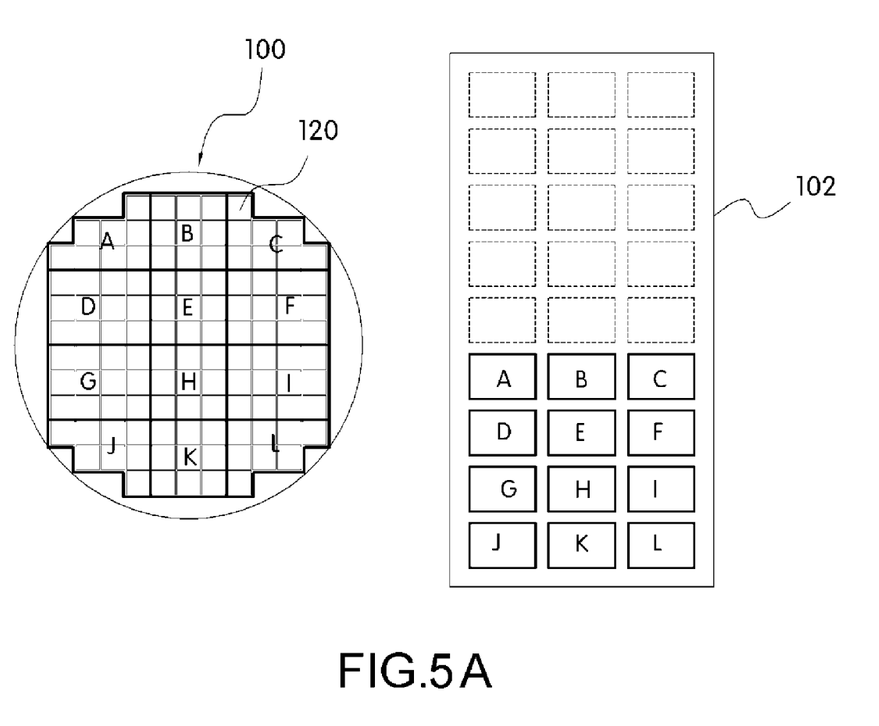
FIG. 5A is a case of diffused lighting.
Figure 5B:
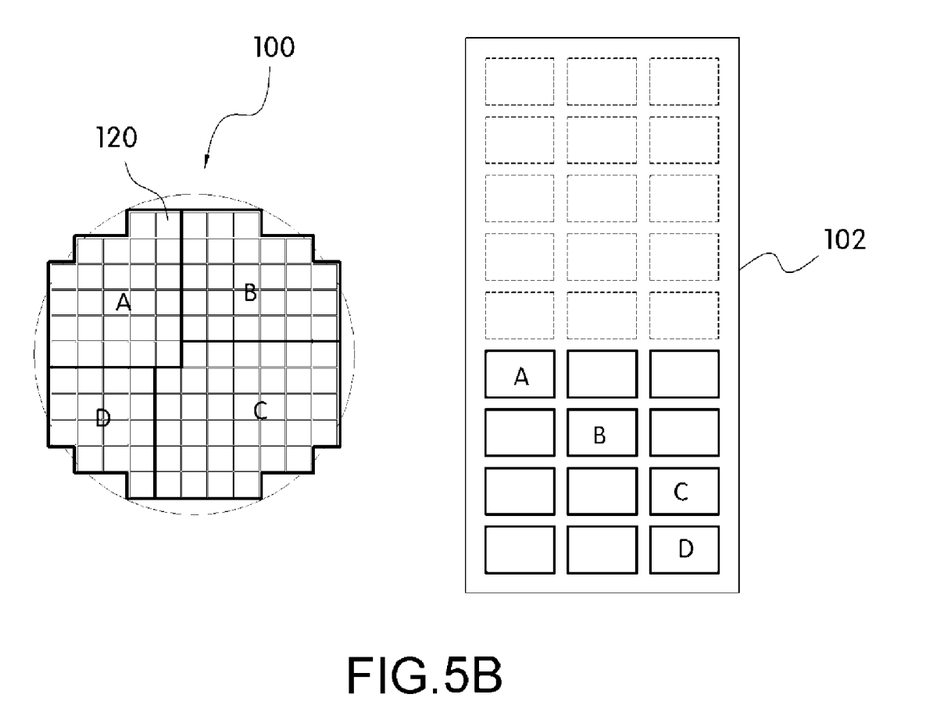
FIG. 5B is a case of concentrated lighting.

FIGS. 3 to 5 illustrate a natural lighting device 200 in which the pixel mirror-type reflection mirror 100 for a natural lighting device according to an embodiment of the present invention is applied.

This natural lighting device 200 includes a main body, a first reflection part 230, a second reflection part 100. Here, the second reflection part 100 is a pixel mirror-type reflection mirror 100 for a natural lighting device according to an embodiment of the present invention. 63. The main body includes a base part 210 installed on the bottom surface of a rooftop of a building, and a support part 220 rotatably coupled to an upper portion of the base part 210.

The main body is provided such that the support part 220 can be rotated around the Z-axis of the base part 210 with respect to the base part 210 fixed to the bottom surface. That is, a first motor 211 is provided on the base part 210, and a gear box 212 coupled to the first motor 211 is coupled to the support part 220, and thus, the support part 220 is rotated through the gear box with respect to the base part 210.

Here, the first motor 211 is controlled by receiving a signal from a control means 250. Accordingly, when the position (azimuth/elevation) of the sun varies with time, the first motor 211 is operated by a signal from the control means 250 to rotate the support part 220, and thus, the first reflection part 230 disposed over the support part 220 is rotated to correspond to the position (azimuth/elevation) of the sun, and the incidence angle to the second reflection part 100 of the sunlight entering the first reflection part 230 is maintained at the same condition as an initial condition. Thus, lighting can be easily performed.

The lower side of the support part 220 is rotatably coupled to the base part 210, the upper side of the support part 220 is coupled to the first reflection part 230, and thus the support part 220 functions to support the first reflection part 230 by allowing the first reflection part to be upwardly spaced apart a predetermined distance from the base part 210. Here, the first reflection part 230 is coupled to an upper end of the support part 220 so as to be rotatable in the vertical direction.

The first reflection part 230 is provided to reflect the sunlight coming from the sun toward the second reflection part 100 by performing a control corresponding to the position of the sun varying with time.

This first reflection part 230 is provided as a plate-shaped planar mirror having a predetermined area, and is rotatably coupled to the support part 220. That is, in the support part 220, a second motor 222 provided with a driving gear at an end portion thereof is provided, and a driven gear engaging with the drive gear is coupled to a rotating stand 224 provided in the first reflection part 230. Here, the driving of the second motor 222 is also controlled by receiving a signal from the control means 250.

Accordingly, when the driving gear is rotated by receiving a driving force from the second motor 222, the rotating stand 224 is rotated by the driven gear engaging with the drive gear, and thus the first reflection part 230 is rotated to adjust an inclination angle. Therefore, when the position (azimuth/elevation) of the sun varies with time, the drive motor is operated by the signal from the control means 250 to vertically rotate the first reflection part 230, and thus the incidence angle to the second reflection part 100 of the sunlight entering the first reflection part 230 is maintained at the same condition as the initial condition. Thus, lighting can be easily performed.

The second reflection part 100 is installed over the first reflection part 230 through a coupling frame 240 extending from the base part 210. This second reflection part 100 is the same as the above-mentioned pixel mirror-type reflection mirror 100 for a natural lighting device, and therefore, detailed description thereof is not provided.

The natural lighting device 200 configured as the above may be mainly installed on a rooftop of a violating building 101. Here, the second reflection part 100 is fixedly installed over the first reflection part 230, and the first reflection part 230 is set such that the sunlight transmitted from the sun is reflected toward the second reflection part 100 disposed thereabove. Also, reflection angles of a plurality of reflection units 120 provided in the second reflection part 100 are individually adjusted through fastening members 130 so as to light a shadow area S of a violated building 102.

Here, the plurality of reflection units 120, as illustrated in FIG. 5A, may be set such that approximately the same number of reflection units 120 light a plurality of shadow regions A, B, C, D, E, F, G, H, I, J, K, and L in a sharing manner, or may also be set such that a plurality of reflection units 120 light a portion A, B, C, and D of the shadow regions in a concentrated manner. 73. Thus, when using the pixel mirror-type reflection mirror 100 for a natural lighting device according to an embodiment of the present invention, an initial installation cost can be dramatically reduced such that a plurality of shadow areas requiring lighting can be lighted together by using a single natural lighting device 200 which is easily manufactured and has an efficient performance, and various types of lighting can be implemented by individually adjusting the reflection angle (or installation angles) of each of the reflection unit 120 through adjustment of an adjusting nut.

As described above, although preferred embodiments have been described in the detailed description of the invention, the invention should not be limited to the embodiments described above. Those skilled in the art could easily modify or change the invention without departing from the spirit and scope of the invention. However, it should be understood that all these modifications, variations, and alterations through a simple design change or modification are clearly within the scope of the invention.

The invention claimed is:

1. A pixel mirror-type reflection mirror for a natural lighting device, the reflection mirror being installed in the natural lighting device to reflect incident light toward an irradiation area and comprising:
   a support plate having a predetermined area;
   a plurality of reflection units disposed as a plate-shaped planar mirror having a predetermined area and disposed on one surface of the support plate so as to be adjacent to each other; and at least one fastening member configured to respectively fix the plurality of reflection units on one side of the support plate,
wherein initial setting angles of the plurality of reflection units are individually adjusted through the fastening member, and
the plurality of reflection units expand and transfer sunlight areas by using diffusion characteristics of sunlight,
wherein each of the fastening member comprises:
a screw rod having a predetermined length and a screw part formed along an outer circumferential surface thereof;
an adjusting nut fastened to one side of the screw rod; and
a fixing nut disposed to contact a rear surface of the reflection unit and fastened to a central portion of the screw rod in a lengthwise direction of the screw rod, and
wherein a spring member is inserted and disposed between the support plate and the reflection unit which face each other so as to surround the outer circumferential surface of the screw rod.

2. The reflection mirror of claim 1, wherein when each of the reflection units has a size about 10 cm·10 cm, a sunlight area expanded to about 56 times a reflection area of each reflection unit is obtained.

3. The reflection mirror of claim 2, wherein the sunlight area expanded through the reflection unit satisfies a gradual increase/decrease relationship, according to a distance, between the reflection area of a reflection unit and the expanded sunlight area which are derived by and on the basis of the following equation: (expanded sunlight area ($cm^2$))=7.7* (reflection area of a reflection unit ($cm^2$))+4900 ($cm^2$).

4. The reflection mirror of claim 1, wherein the reflection unit is provided to have a shape of a circular face, a polygonal face, or a combination thereof.

5. The reflection mirror of claim 1, wherein an initial reflection angle of each of the plurality of reflection units is individually adjusted through adjusting the adjusting nut.

6. The reflection mirror of claim 1, wherein the at least one fastening member comprises three fastening members, and the three fastening members are disposed so as to define a triangle.

* * * * *